(12) United States Patent
Dean et al.

(10) Patent No.: US 10,451,475 B2
(45) Date of Patent: Oct. 22, 2019

(54) GAUGE LENGTH OPTIMIZATION IN DISTRIBUTED VIBRATION SENSING

(71) Applicant: SCHLUMBERGER TECHNOLOGY CORPORATION, Sugar Land, TX (US)

(72) Inventors: Timothy Dean, Winchester (GB); Theo Cuny, Clamart (FR); Arthur Hartog, Winchester (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/537,186

(22) PCT Filed: Jan. 7, 2016

(86) PCT No.: PCT/US2016/012410
§ 371 (c)(1),
(2) Date: Jun. 16, 2017

(87) PCT Pub. No.: WO2016/112147
PCT Pub. Date: Jul. 14, 2016

(65) Prior Publication Data
US 2018/0003550 A1 Jan. 4, 2018

Related U.S. Application Data

(60) Provisional application No. 62/100,741, filed on Jan. 7, 2015.

(51) Int. Cl.
*G01L 1/24* (2006.01)
*G01H 9/00* (2006.01)
(Continued)

(52) U.S. Cl.
CPC ............ *G01H 9/004* (2013.01); *G01L 1/242* (2013.01); *G01M 5/0025* (2013.01);
(Continued)

(58) Field of Classification Search
CPC ..... G01V 1/242; G01H 9/004; G01M 5/0091; G01M 7/025; E21B 47/01
See application file for complete search history.

(56) References Cited

U.S. PATENT DOCUMENTS 6,687,011 B1 * 2/2004 Lee .................. G01B 11/161
356/35.5
6,778,720 B1 8/2004 Cekorich et al.
(Continued)

FOREIGN PATENT DOCUMENTS

GB 2222247 A 2/1990
GB 2442745 A 4/2008
(Continued)

OTHER PUBLICATIONS

Hartog A. et al., "The Optics of Distributed Vibration Sensing", EAGE—Second EAGE Workshop on Permanent Reservoir Monitoring, 5 pages.
(Continued)

*Primary Examiner* — Ian J Lobo

(57) ABSTRACT

A technique facilitates the use and application of a distributed vibration sensing system in, for example, a well application. The technique enables selection of a desired gauge length to achieve an optimum trade-off between the spatial resolution of a distributed vibration sensing/distributed acoustic sensing system and signal-to-noise ratio. The optimum gauge length can vary according to specific factors, e.g. depth within a well, and the present technique can be
(Continued)

used to account for such factors in selecting an optimal gauge length which facilitates accurate collection of data on dynamic strain.

17 Claims, 5 Drawing Sheets

(51) Int. Cl.
*G01M 7/02* (2006.01)
*G01M 5/00* (2006.01)
*E21B 47/01* (2012.01)

(52) U.S. Cl.
CPC ............ *G01M 7/025* (2013.01); *E21B 47/01* (2013.01); *G01M 5/0091* (2013.01); *G01V 2210/1429* (2013.01)

(56) References Cited

U.S. PATENT DOCUMENTS

| | | | |
|---|---|---|---|
| 7,946,341 B2 | 5/2011 | Hartog et al. | |
| 8,225,867 B2 | 7/2012 | Hartog et al. | |
| 8,347,958 B2 | 1/2013 | Hartog et al. | |
| 8,605,542 B2 | 12/2013 | Coates et al. | |
| 9,880,047 B2 | 1/2018 | Martin et al. | |
| 9,880,048 B2 * | 1/2018 | Martin | G01D 5/35361 |
| 2011/0320147 A1 | 12/2011 | Brady et al. | |
| 2012/0067118 A1 | 3/2012 | Hartog et al. | |
| 2012/0179378 A1 | 7/2012 | Duncan et al. | |
| 2013/0021615 A1 | 1/2013 | Duncan et al. | |
| 2013/0242698 A1 * | 9/2013 | McEwen-King | G01V 1/20 367/37 |
| 2014/0064028 A1 | 6/2014 | Coates et al. | |
| 2014/0153364 A1 * | 6/2014 | Lewis | G01V 1/226 367/41 |
| 2016/0123798 A1 * | 5/2016 | Godfrey | G01H 9/004 73/643 |
| 2016/0245077 A1 * | 8/2016 | Willis | E21B 47/102 |
| 2017/0045410 A1 * | 2/2017 | Crickmore | G01M 3/002 |
| 2018/0045040 A1 * | 2/2018 | Swan | E21B 47/02 |

FOREIGN PATENT DOCUMENTS

| | | |
|---|---|---|
| WO | WO2010136810 A2 | 12/2010 |
| WO | WO2011162868 A2 | 12/2011 |

OTHER PUBLICATIONS

Posey, R. et al, "Strain Sensing Based on Coherent Rayleigh Scattering in an Optical Fibre", Electron. Lett. vol. 36 No. 20, pp. 1688-1689.

Mateeva, A. et al., "Distributed Acoustic Sensing for Reservoir Monitoring With Vertical Seismic Profiling", Geophysical Prospecting, (2014) vol. 62, pp. 679-692.

Hartog, A. et al, "Vertical Seismic Optical Profiling on Wireline Logging Cable", Geophysical Prospecting, (2014) vol. 62, pp. 693-701.

International Search Report and Written Opinion for corresponding PCT Application Serial No. PCT/US2016/012410, dated Apr. 29, 2016, 15 pages.

* cited by examiner

Data (a) Before and (b) After Wavenumber Filtering
with the Limit Being the First Notch

GAUGE LENGTH OPTIMIZATION IN DISTRIBUTED VIBRATION SENSING

CROSS-REFERENCE TO RELATED APPLICATION

The present document is based on and claims priority to U.S. Provisional Application Ser. No. 62/100,741, filed Jan. 7, 2015, which is incorporated herein by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed to control and enhance the efficiency of producing the various fluids from the reservoir. One piece of equipment which may be installed is a distributed vibration sensor. Distributed vibration sensing (DVS), also known as distributed acoustic sensing (DAS), is a technique that uses an optical fiber as a very sensitive, continuous, sensor of dynamic strain. In use, the fiber is effectively coupled to the vibration which applies strain to the fiber and this converts the fiber into a distributed sensor of mechanical vibration. Such a sensor can be of varying length, but difficulties arise in determining the optimal gauge length.

SUMMARY

In general, a technique relates to use of a distributed vibration sensing system in, for example, a well application. The technique facilitates selection of a desired gauge length to achieve an optimum trade-off between the spatial resolution of a distributed vibration sensing/distributed acoustic sensing system and signal-to-noise ratio. The optimum gauge length can vary according to specific factors, e.g. depth within a well, and the present technique can be used to account for such factors in selecting an optimal gauge length which facilitates accurate collection of data on dynamic strain.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
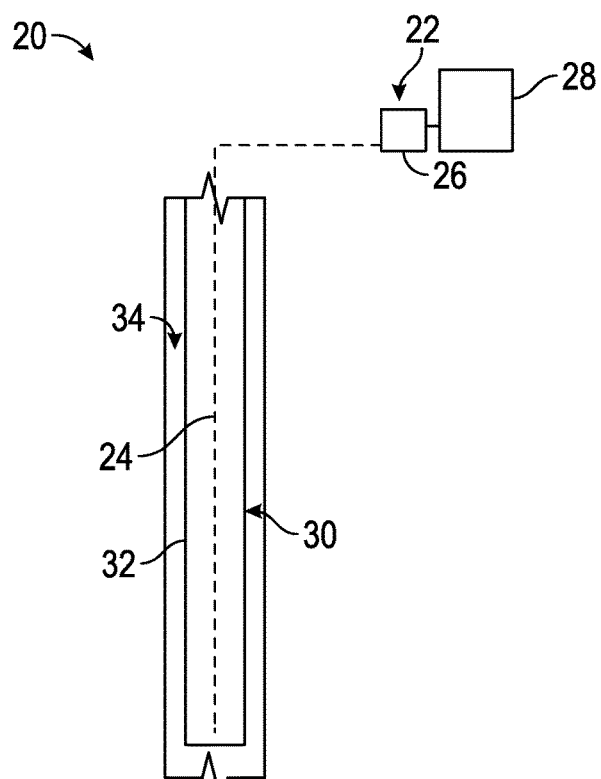
FIG. 1 is a schematic illustration of an example of a well system comprising a distributed vibration sensing system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology which facilitate use of a distributed vibration sensing system for collecting data. For example, the distributed vibration sensing system may be employed in a well application to provide improved collection of strain related data. The technique facilitates selection of a desired gauge length to achieve an optimum trade-off between the spatial resolution of a distributed vibration sensing/distributed acoustic sensing system and signal-to-noise ratio. The optimum gauge length can vary according to specific factors, e.g. depth within a well, and the present technique can be used to account for such factors in selecting an optimal gauge length which facilitates accurate collection of data, e.g. data on dynamic strain experienced by a well string or other well system.

A distributed vibration sensing (DVS) system, also known as distributed acoustic sensing (DAS) system, may comprise sensors used in vertical seismic profiling where the distributed sensor is employed to detect seismic waves generated outside the well by coupling the detected waves into the well via the sensing fiber. In the following description, the term DVS is used as a common reference for both DVS and DAS. Other applications for DVS include listening for noise in a well which is caused by the movement of fluids and/or other processes occurring in the well.

An example of a sensitive DVS system uses Rayleigh backscatter, a signal that results from a probe signal travelling in a fiber and losing light to an elastic process (Rayleigh scattering). A small fraction of that scattered light is re-captured by a waveguide in the return direction and this is the signal that is detected back at an interrogation unit. The interrogation unit may be part of or coupled with a processor-based control system for processing of the collected waveform data.

In DVS systems, a narrowband laser may generally used and its use results in interference between backscatter returned from different parts of the fiber that are occupied by a probe pulse at any one time. This is a form of multi-path interference and gives rise to a speckle-like signal in one dimension (along the axis of the fiber), sometimes referred to as coherent Rayleigh noise or coherent backscatter. The term "phase-OTDR (optical time domain reflectometry)" also is used in this context. The interference modulates both the intensity and the phase of the backscattered light and minute (<<wavelength) changes in the length of a section of fiber are sufficient to radically alter the value of the amplitude and phase and consequently the technique can be useful for detecting small changes in strain.

However, the local amplitude (proportional to the square root of the intensity) or the phase, which may be measured locally with respect to specific positions in the fiber, has a strongly non-linear relationship to the applied strain. In contrast, measurement of the phase-difference across a length of fiber results in a more linear transfer function between strain and the phase-difference. The phase difference may be measured in the electrical or digital domains by mixing the backscattered light with a local oscillator which converts the scattered light, including its phase, down to a frequency that can be captured electronically. The phase-difference may then be calculated in the digital domain or by an analog phase-measuring circuit prior to digitization.

In another example, the phase of the scattered light returning from two separate locations may be compared in the optical domain with a phase-sensing interferometer which includes a delay-line fiber that results in the mixing at the detector of the backscattered light returning from two separate locations in the fiber. Another approach is to launch pairs of probe pulses separated by a defined frequency and launching time, thus resulting in two sets of backscatter signals at different frequencies that combine at the detector to form a beat frequency. The backscatter signals arriving at the detector have been scattered from slightly different locations in the fiber, that are separated by $\Delta L = \Delta T \cdot c / (2 \cdot Ng)$, where $\Delta T$ is the time separation of the probe pulses, c is the speed of light in vacuum, and Ng is the group index of the fiber. Another approach is to modulate the phase of one of a pair of pulses such that the phase of the second pulse, relative to that of the first is varied in a pre-defined way on each repetition of the pulse sequence (for example the relative phase of the pulses is shifted by a quarter of a cycle between repetitions of the pulse sequence). Regardless of how the phase is acquired, these differential phase techniques involve comparing the phase at two locations in the fiber separated by what is sometimes known as the "gauge length" or "differentiation interval".

As described in greater detail below, the present disclosure provides methods for selecting a desired gauge length to achieve an optimal trade-off between the spatial resolution of the DVS system and the signal-to-noise ratio. Embodiments described herein facilitate selection of the gauge length for a given DVS system. Guidelines are provided for selecting a value close to optimum in light of various factors which can affect the optimum. For example, the optimum value can vary with depth down a well as a result of varying seismic wave velocity for the apparent velocity (a quantity that takes into account the angle with respect to the axis of a system sensor).

As the gauge length is increased from a small value, the size of the seismic signal that is converted to a phase-difference signal increases. If the noise were independent of gauge length, this would translate directly into a linear signal-to-noise ratio improvement. Whether the noise is independent of gauge length, however, may depend on the system design and which types of noise dominate. In some extreme cases, the phase noise of the laser could lead to an increase in noise with increasing gauge length.

Additionally, the linearity of the conversion from distributed strain to phase-difference tends to improve as the gauge length increases, assuming a uniform disturbance along the fiber. The reason for this is that the phase-difference response is a combination of a linear contribution that is proportional to the gauge length and a random element resulting from the disturbance of those parts of the fiber from which the backscatter signals used to provide the phase-difference are scattered. The random element is gauge-length independent and non-linear; the longer the gauge length, the greater the linear proportion and the more linear the overall response.

However, as the gauge length increases wavenumber filtering effects come into play. In the case of a continuous seismic wave, those values of the seismic wavelength that are equal to, or are an integer multiple of, the gauge length show no response. In the more typical case of a finite duration wavelet, similar effects occur. If observed in the distance, rather than wavenumber domain, it has been found that as the gauge length approaches the main wavelength in the seismic wavelet, the seismic signal is broadened (so the spatial resolution of the measurement is degraded). Eventually the recorded signal splits into a doublet, with a first signal when the seismic wavelet enters the gauge length and a second when it leaves the gauge length.

In an embodiment involving a borehole seismic application where the seismic wave velocity tends to vary with depth, there is therefore a range of gauge length values that, for a given portion of a well, approximately optimizes the overall performance of the measurement, taking into account spatial resolution, signal-to-noise ratio and signal distortion. It is generally impractical to select a different gauge length for each discernable location along the sensing fiber. However there is a range of values, for each wavelength of the seismic signal detected, that approximates an optimum value based on spatial resolution and signal-to-noise.

Referring generally to FIG. 1, an example of a well system 20 comprising a DVS system 22 is illustrated. In this embodiment, the DVS system 22 comprises an optical fiber 24 used to obtain data, e.g. strain data. The optical fiber 24 may be in the form of a cable and may be coupled with an interrogation unit 26. For some applications, the interrogation unit 26 includes a detector for monitoring backscatter signals. Additionally, the interrogation unit 26 may comprise a suitable laser, e.g. a narrowband laser, to establish interference between backscatter signals returned from different parts of the fiber 24. For example, the interrogation unit 26 may be used to provide a probe signal sent along fiber 24 via the laser. The interrogation unit 26 also may be part of or coupled with a processor-based control system 28 used to process the collected data, e.g. strain data.

In the specific example illustrated, the fiber 24 is deployed along well equipment 30. By way of example, the well equipment 30 may comprise a well string 32, e.g. a tubing string, and the fiber 24 may be secured along the well string 32. Depending on the application, the fiber 24 may be adhered to or otherwise affixed to the well string 32 so as to facilitate monitoring of strains experienced due to vibrations from seismic waves, fluid flow, and/or other sources. As illustrated, the well string 32 may be deployed in a wellbore 34 although the DVS system 22 may be employed in other well applications and in non-well applications.

Figure 2:
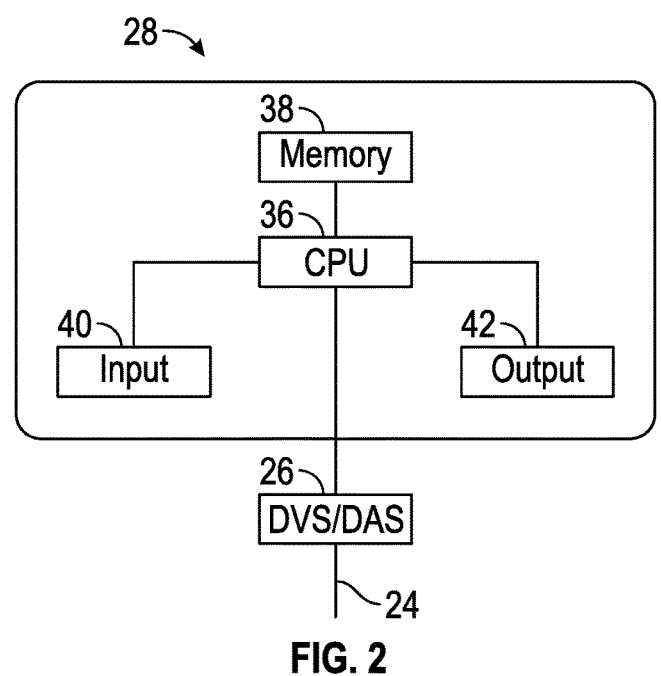
FIG. 2 is an illustration of an example of a control system which may include or work in cooperation with the distributed vibration sensing system to process data related to, for example, dynamic strain, according to an embodiment of the disclosure.

The data obtained by DVS system 22 may be processed according to various methods as described above. Additionally, the data may be processed in whole or in part on processor-based control system 28. An example of the processing system 28 is illustrated in FIG. 2 and may be in the form of a computer-based system having a processor 36, e.g. a central processing unit (CPU). The processor 36 may be operatively employed to intake data from fiber 24/interrogation unit 26 and to process the data. Depending on the application, the processing of data may involve the running of various models/algorithms related to evaluation of signal data, e.g. backscatter data, received from the distributed vibration sensing fiber 24. By way of example, the data may be processed to determine a suitable range, e.g. optimal range, of gauge length values for the DVS system 22 for a particular portion of the sensing fiber 24 based on the main wavelength of interest in the signals detected, as described in greater detail below. In some systems, the gauge length is determined by the settings in the equipment or indeed a physical length of fibre within the equipment.

The processor 36 may be operatively coupled with a memory 38, an input device 40, and an output device 42. Input device 40 may comprise a variety of devices, such as a keyboard, mouse, voice recognition unit, touchscreen, other input devices, or combinations of such devices. Output device 42 may comprise a visual and/or audio output device, such as a computer display, monitor, or other display medium having a graphical user interface. Additionally, the processing may be done on a single device or multiple devices on location, away from the well location, or with some devices on location and other devices located remotely. Once the desired signal processing has been conducted to evaluate the vibrations/strains for determining the desired gauge length, the processed data, results, analysis, and/or recommendations may be displayed on output 42 and/or stored in memory 38.

The recording of seismic data using distributed vibration sensing (DVS) systems can, in some embodiments, include applying a moving average filter to conventionally recorded (point sensor) measurements. The effective length of the sensing fiber (the gauge length or L), analogous to the order of the moving average filter, affects both the amplitude and wavelength of the resulting total change in length (ΔL) of the fiber 24. The resulting amplitude (measured from peak to peak) and the wavelength (i.e. resolution) are illustrated in the upper and lower graphs, respectively, of FIG. 3.

For gauge length values less than the signal wavelength, the resulting wavelet has a single lobe as illustrated by inset plot 44. For gauge length values greater than the signal wavelength, the wavelet has two lobes as illustrated by inset plot 46. As the gauge length increases, the resolution (i.e. the measured wavelength) degrades but the amplitude (as a result of the addition of further segments) increases and reaches a peak value of about ⅔ of the wavelength (beyond this the width of the wavelet peak starts to increase in width before becoming two peaks).

Figure 3:
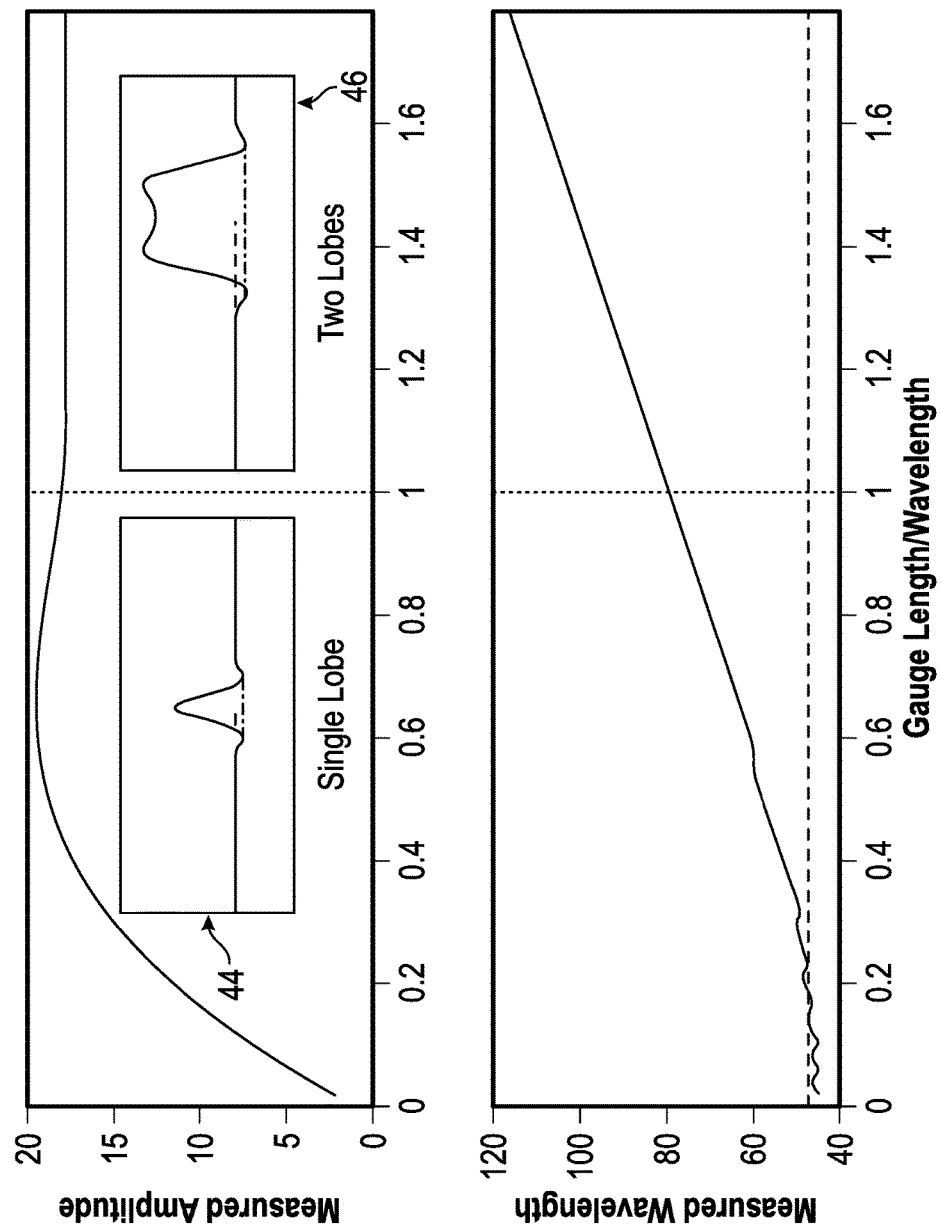
FIG. 3 is a graphical illustration of an example of gauge length/wavelength versus measured wavelength and measured amplitude, according to an embodiment of the disclosure.

The results illustrated in FIG. 3 relate to a change in length of the fiber 24 (ΔL) and not for strain (ΔL/L). Furthermore, the results do not include noise. Analysis of real data shows that the noise level is independent of gauge length at least for the data obtained this example. Given an error in ΔL of (δ) then the measured strain (ε) is given by:

$$\varepsilon = \frac{\Delta L + \delta \Delta L}{L} \quad (1)$$

Figure 4:
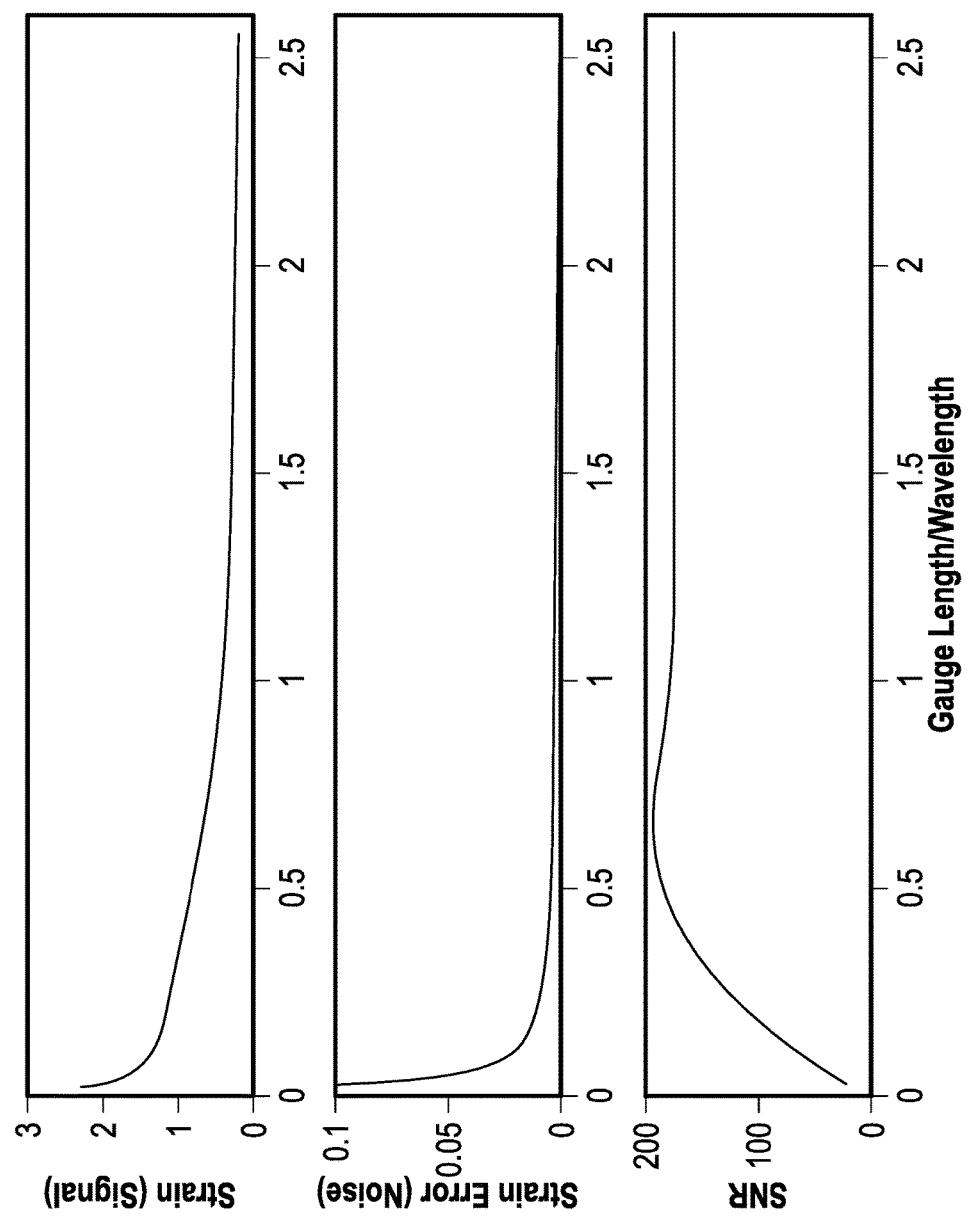
FIG. 4 is a graphical illustration of an example of gauge length/wavelength versus signal-to-noise ratio, strain error, and strain, according to an embodiment of the disclosure.

The strain error (noise) and strain (signal) are illustrated graphically in FIG. 4 as plotted against gauge length/wavelength.

Assuming that δΔL is independent of L then the error in the strain measurement should be proportional to 1/L. The signal-to-noise ratio (SNR) of the data is therefore:

$$SNR = \frac{\Delta L/L}{\delta \Delta L/L} = \frac{\Delta L}{\delta \Delta L} \quad (2)$$

An example of the theoretical relationship between SNR and gauge length also is illustrated in FIG. 4 (see lower graph). The SNR is plotted versus gauge length/wavelength and this is a scaled copy of the amplitude plot of FIG. 3. As expected from equation 2, the SNR is simply ΔL divided by a constant.

Figure 5:
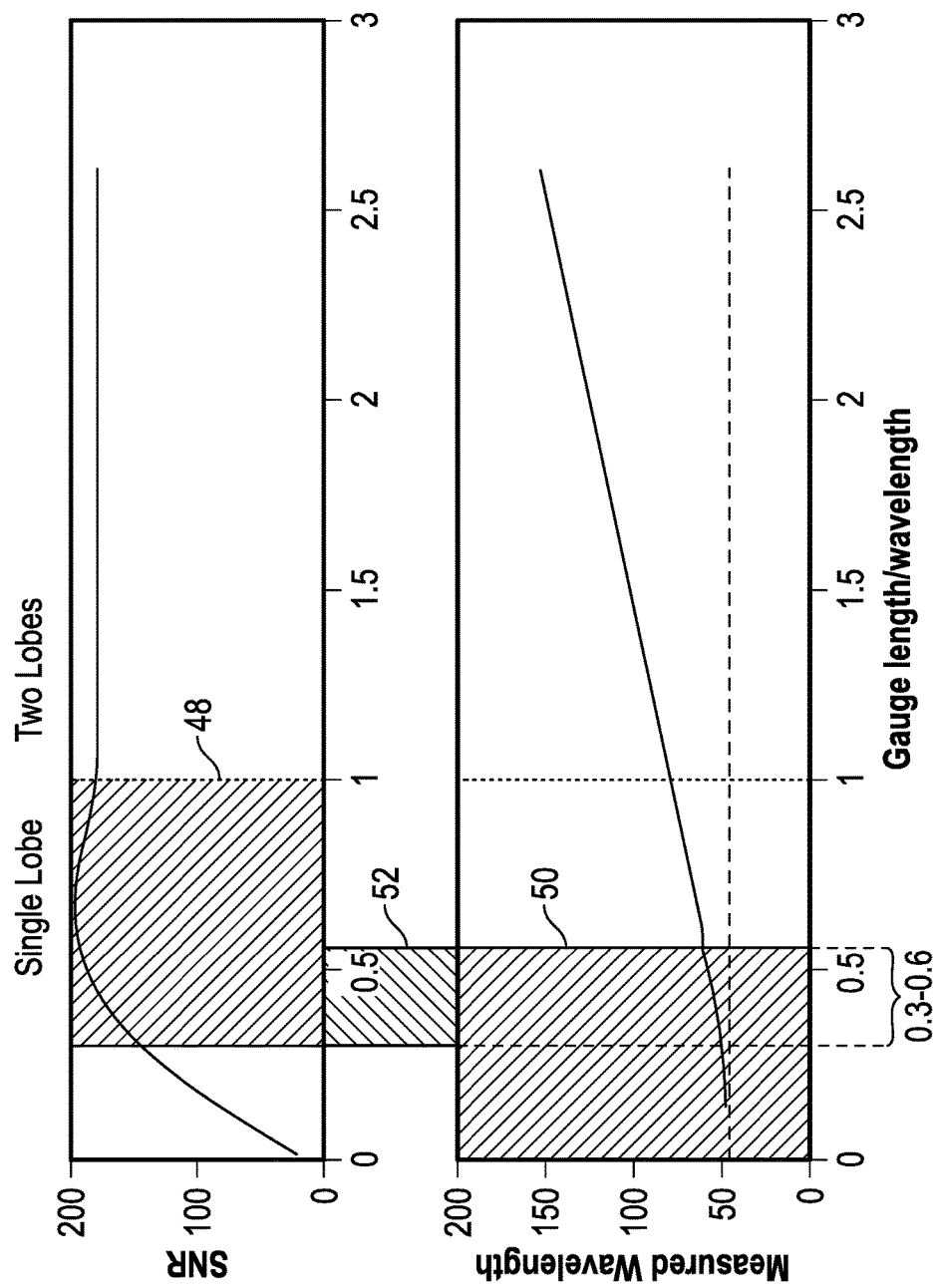
FIG. 5 is another graphical illustration of an example of gauge length/wavelength versus measured wavelength and signal-to-noise ratio, according to an embodiment of the disclosure.

Using these results, the optimum gauge length for a specific use can be determined based on the wavelength (resolution) illustrated graphically in FIG. 3 and the SNR illustrated graphically in FIG. 4. With additional reference to FIG. 5, a high SNR is desired while staying below the two-lobe limit represented by box 48 in the upper graph of FIG. 5. It is also desirable to avoid degrading resolution in the range represented by box 50 in the lower graph of FIG. 5. The range within which these values intersect is illustrated graphically by box 52 in FIG. 5 and that range includes values of the gauge length to wavelength ratio of between 0.3 and 0.6. The graphical representation illustrates a desirable compromise between spatial resolution and SNR. If, however, SNR is a substantial issue then it may be appropriate to accept reduced resolution for increased SNR. But, it should be kept in mind that there is no point exceeding the SNR peak value of about ⅔. Thus if the single or primary consideration is SNR (and the spatial resolution is deemed not to be important) then a desired value of (gauge length/wavelength) is ⅔.

Consequently, optimum limits on gauge length (GL) may be provided by the equation:

$$GL = \frac{\text{ratio} * V_{min}}{f_{dom}} \quad (3)$$

In this equation, ratio is the target gauge length/wavelength ratio, Vmin is the minimum velocity, and fdom is the dominant frequency.

Figure 6:
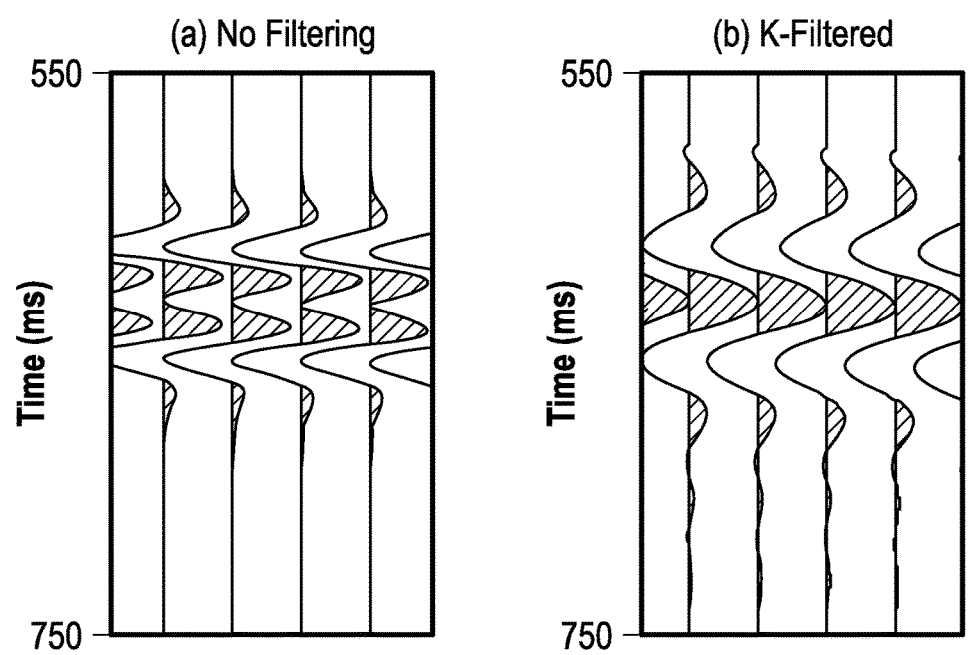
FIG. 6 is a graphical illustration of an example of collected data before and after wave number filtering, according to an embodiment of the disclosure.

In some embodiments, the gauge length may be determined before the survey based on previous data. However, if such historical data is not available then data may be acquired using a pre-determined, preliminary, gauge length. The maximum wavenumber of interest may then be identified from a frequency-wavenumber plot, and the gauge length may be adjusted accordingly. It should be noted there may be a range of velocities of interest so the gauge length may be longer than that defined in equation 3. In such a case, a k-filter may be applied to avoid having multi-peaked wavelets, as represented graphically in FIG. 6.

The choice of the initial gauge length may be guided by prior knowledge of the expected velocities of the waves that are of interest. For example, the initial gauge length may be selected based on expected velocity values for the local geology, e.g surrounding geologic formation. In the absence of such prior knowledge, a short preliminary gauge length (e.g. 10 m) may be selected to avoid excessive loss of spatial resolution. However, in situations where the initial signal-to-noise ratio is likely, or known, to be poor, then a longer preliminary gauge length (e.g. 40-50 m) can be selected. In any event, the gauge length is adjusted for subsequent calculations or measurements based on results obtained using the preliminary gauge length.

In applications in which the DVS unit 26/processor system 28 provide an estimate of the phase, rather than the phase-difference of the backscatter across the gauge length, then a first calculation of the phase-difference can be made with a starting value for the gauge length based on estimates of the wave velocity from knowledge of local geology or simply from an arbitrarily chosen value (which typically would be rather short to avoid the doublet effects mentioned above). From this initial data set, the actual velocity can be estimated and the desired gauge length can be calculated at each level. The gauge length can then be set according to the initial calculation in a second stage. In systems where the gauge length is defined after the acquisition, then gauge length can be varied at arbitrarily fine intervals. However, a few different values (e.g. 2-4) should be sufficient to gain most of the benefit of the methods disclosed herein.

In applications utilizing data acquisition systems, e.g. DVS unit 26/processor system 28, where the phase-difference is intrinsic to the measurement, then a first gauge length set can be acquired with an initial gauge length. Subsequently, a process may be applied similar to that described in the previous paragraph followed by a new acquisition with one or more desired gauge length(s).

Accordingly, the methodology described herein for gauge length optimization in distributed vibration sensing may be used in a variety of applications and environments. For example, the methodology may be used for selecting a suitable range of gauge length values for a DVS system for a particular portion of the sensing cable/fiber 24 based on a main wavelength of interest in the signals, e.g. seismic signals, to be detected. In some applications, the wavelength may be estimated from prior knowledge and the prior knowledge may include knowledge of the geology, e.g. the geologic formation, surrounding the particular portion of interest with respect to the optical cable/fiber 24. The wavelength also may be estimated based on estimates of the seismic wave velocity and seismic signal spectrum in the portion of the optical fiber 24 where the gauge length is to be optimized. The wavelength estimation also may include and utilize an angle of arrival of the seismic wave and thus the apparent velocity of the seismic wave when detected at the sensing cable/fiber 24.

The methodology for selecting a range of gauge length values, e.g. an optimal gauge length, also may involve making a preliminary measurement and signal extraction using a pre-defined (non-optimized) gauge length; performing an analysis of the results to estimate the apparent velocity and signal spectrum; and repeating the signal extraction and/or the measurement with an optimized gauge length based on the results of the preliminary measurement and signal extraction. In this example, the phase of the backscattered light resulting from the input of interrogation unit 26 (and monitored by interrogation unit 26) may be determined in the electrical or digital domain. The phase difference may then be calculated from the determined phase, and the repeating of the signal extraction and/or measurement may use the same phase data to calculate a phase difference with an optimized gauge length. In some applications, the repeating may involve acquiring a new set of phase-differences in the backscatter with an optimized gauge length. This approach may be particularly appropriate where the acquisition apparatus defines the gauge length at or before the time of acquisition.

In some embodiments of the methodology, the phase-difference obtained with different gauge lengths may be aggregated to provide a combined multi-gauge length result. Additionally, the methodology of optimizing gauge length also may take into account a pre-defined variation of the phase noise of the acquisition system as a function of gauge length.

It should be noted the foregoing descriptions have been implicitly specific to compression arrivals (p-waves). Of course, other types of waves can occur with radically different velocities (e.g., shear waves, refracted waves). Each wave type can therefore be optimized with its own gauge length.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for use in a well, comprising:
   deploying an optical fiber along a well system;
   positioning the well system in a wellbore;
   connecting the optical fiber into a distributed vibration sensing system;
   employing the optical fiber to measure signals indicative of vibrations incurred along the well system, wherein the vibrations are in the form of seismic waves; and
   using a wavelength of interest in the vibrations to be detected to select a range of gauge length values for a desired portion of the optical fiber, wherein using comprises estimating the wavelength of interest based on estimates of seismic wave velocity and seismic signal spectrum along the desired portion so as to optimize the range of gauge length values to achieve at least one of a desired signal-to-noise ratio and a desired spatial resolution for measurement of the signals indicative of the vibrations.

2. The method as recited in claim 1, wherein using comprises estimating the wavelength from prior knowledge.

3. The method as recited in claim 2, wherein using comprises using prior knowledge of the geology surrounding the desired portion.

4. The method as recited in claim 1, wherein using further comprises estimating the wavelength based on the angle of arrival of the seismic waves and thus the apparent velocity of the seismic waves when detected at the optical fiber.

5. The method as recited in claim 1, further comprising making a preliminary measurement and signal extraction using a pre-defined and non-optimized gauge length.

6. The method as recited in claim 1, wherein using comprises optimizing the gauge length by utilizing a pre-defined variation of the phase noise of an acquisition system as a function of gauge length.

7. A method for use in a well, comprising:
   deploying an optical fiber along a well system;
   positioning the well system in a wellbore;
   connecting the optical fiber into a distributed vibration sensing system;
   employing the optical fiber to measure signals indicative of vibrations incurred along the well system;
   making a preliminary measurement and signal extraction using a pre-defined and non-optimized gauge length for a desired portion of the optical fiber, and
   performing an analysis of results from the preliminary measurement and signal extraction to estimate an apparent velocity and signal spectrum of the vibrations to be detected; and repeating the signal extraction and/or measurement with an optimized gauge length based on the results of the preliminary measurement and signal extraction, wherein the optimized gauge length is selected to achieve at least one of a desired signal-to-noise ratio and a desired spatial resolution.

8. The method as recited in claim 7, further comprising determining the phase of backscattered light in the optical fiber based on the electrical or digital domain; calculating the phase difference from the determined phase; and using the same phase data in the repeating of the signal extraction and/or measurement to calculate a phase difference with the optimized gauge length.

9. The method as recited in claim 8, wherein repeating of the signal extraction and/or measurement involves acquiring a new set of phase-differences in the backscatter with the optimized gauge length.

10. The method as recited in claim 8, further comprising segregating the phase-differences obtained with different gauge lengths to provide a combined multi-gauge length result.

11. A method, comprising:
deploying a distributed vibration sensing system to detect dynamic strain along an optical fiber resulting from seismic waves; and
using a wavelength of interest of the seismic waves causing the dynamic strain to select an optimal gauge length value to achieve at least one of a desired signal-to-noise ratio and a desired spatial resolution for a portion of the optical fiber,
wherein using comprises estimating the wavelength of interest based on estimates of seismic wave velocity and seismic signal spectrum of the seismic waves.

12. The method as recited in claim 11, further comprising measuring dynamic strain in the optical fiber resulting from the seismic waves.

13. The method as recited in claim 12, further comprising using the seismic waves for vertical seismic profiling.

14. The method as recited in claim 11, further comprising measuring dynamic strain in the optical fiber resulting from movement of fluids in a well.

15. The method as recited in claim 11, wherein using comprises estimating the wavelength from prior knowledge so as to optimize the gauge length, the prior knowledge including knowledge of the geology surrounding the desired portion.

16. A method, comprising:
deploying a distributed vibration sensing system to detect dynamic strain along an optical fiber caused by seismic waves;
making a preliminary measurement and signal extraction using a pre-defined and non-optimized gauge length to establish preliminary gauge length data, wherein the pre-defined and non-optimized gauge length is selected by estimating seismic wave velocity and seismic signal spectrum of the seismic waves; and
using the preliminary gauge length data and a wavelength of interest in the seismic waves causing the dynamic strain to select an optimal gauge length value for a portion of the optical fiber to achieve at least one of a desired signal-to-noise ratio and a desired spatial resolution.

17. The method as recited in claim 16, further comprising measuring dynamic strain in the optical fiber which results from the seismic waves using the selected optimal gauge length.

* * * * *